(12) United States Patent
Trzebiatowski et al.

(10) Patent No.: US 11,987,161 B2
(45) Date of Patent: May 21, 2024

(54) SNOWMOBILE ASSISTANT DEVICE

(71) Applicants: Tim Trzebiatowski, Amherst, WI (US); Eric Stuczynski, Amherst Junction, WI (US)

(72) Inventors: Tim Trzebiatowski, Amherst, WI (US); Eric Stuczynski, Amherst Junction, WI (US)

( * ) Notice: Subject to any disclaimer, the term of this patent is extended or adjusted under 35 U.S.C. 154(b) by 61 days.

(21) Appl. No.: 17/743,773

(22) Filed: May 13, 2022

(65) Prior Publication Data
US 2022/0371502 A1 Nov. 24, 2022

Related U.S. Application Data

(60) Provisional application No. 63/190,334, filed on May 19, 2021.

(51) Int. Cl.
B62B 15/00 (2020.01)
B60P 3/06 (2006.01)
B62B 5/00 (2006.01)

(52) U.S. Cl.
CPC ............ B60P 3/062 (2013.01); B62B 5/0083 (2013.01); *B62B 2202/90* (2013.01)

(58) Field of Classification Search
CPC .... B60P 3/062; B60P 3/00; B60P 3/06; B62B 5/00; B62B 5/0083; B62B 5/0086; B62B 15/009; B62B 2202/90; B62B 13/18
See application file for complete search history.

(56) References Cited

U.S. PATENT DOCUMENTS

| | | | | |
|---|---|---|---|---|
| 3,477,734 A * | 11/1969 | Albertson | ............. | B62K 13/00 180/184 |
| 3,552,515 A * | 1/1971 | Tomita | .................... | B62B 13/18 180/184 |
| 3,570,616 A * | 3/1971 | Tominaga | ............. | B62M 27/02 180/185 |
| 3,570,617 A * | 3/1971 | O'Day | .................... | B62B 13/18 180/184 |
| 3,647,237 A * | 3/1972 | Milton | ...................... | B62B 3/04 254/8 R |
| 3,667,728 A * | 6/1972 | Garelick | ............... | B62B 5/0089 254/8 R |
| 3,860,078 A | 1/1975 | Stoick | | |
| 5,716,061 A | 2/1998 | Sloan | | |
| 6,244,603 B1 * | 6/2001 | Rizzardi | .................. | B62B 1/26 114/344 |
| 6,824,147 B2 * | 11/2004 | Ouellette | ............... | B62M 27/00 280/7.14 |

(Continued)

Primary Examiner — James M Dolak
(74) Attorney, Agent, or Firm — Carlin Law LLC

(57) ABSTRACT

A wheeled device for increasing the mobility of a snowmobile or ski-bound vehicle, wherein the wheeled device, having a cylindrical axle, is attached to the bolt on the interior of a sled ski underneath the snowmobile sled, which raises the skis off the ground and does not increase the snowmobile sled width. The wheeled device surrounds the interior sled ski bolts and nuts thereon and is tightened onto said bolts and nuts by way of a tightening wheel. The snowmobile is thus able to drive on the wheeled devices so that it can conveniently move from one location to another without damaging the bottom of the skis if on rough or unstable terrain.

8 Claims, 10 Drawing Sheets

(56) References Cited

U.S. PATENT DOCUMENTS

| | | | | |
|---|---|---|---|---|
| 6,832,769 B2* | 12/2004 | Savage | ............... | B60P 3/062 |
| | | | | 280/79.11 |
| 6,869,087 B2* | 3/2005 | Veeser | ............... | B60P 3/062 |
| | | | | 280/79.11 |
| 7,261,060 B1* | 8/2007 | Garofola | ............ | A01K 1/0236 |
| | | | | 119/482 |
| 7,290,774 B2* | 11/2007 | Despres | ............... | B62B 13/18 |
| | | | | 280/11 |
| 7,461,857 B2* | 12/2008 | Darling, III | ......... | A61G 1/0293 |
| | | | | 280/640 |
| 8,505,929 B2* | 8/2013 | Lachance | ............... | B62B 13/18 |
| | | | | 280/10 |
| 8,517,343 B1* | 8/2013 | VanValkenburgh | .... | B66F 15/00 |
| | | | | 254/8 R |
| 8,955,238 B1* | 2/2015 | Castruccio | ............ | E01H 5/061 |
| | | | | 37/231 |
| 9,266,402 B2* | 2/2016 | Lacombe | ............... | B60F 5/00 |
| 9,533,737 B2* | 1/2017 | Beaudoin | ............... | B62B 13/18 |
| 9,925,996 B2* | 3/2018 | Crynick | ............... | B62B 5/0086 |
| 10,059,362 B1* | 8/2018 | Robillard | ............... | B62B 17/02 |
| 10,486,729 B2* | 11/2019 | DeLanghe | ............... | B62B 13/08 |
| 10,625,761 B2* | 4/2020 | Brooks | ............... | B62B 1/06 |
| 10,994,765 B2* | 5/2021 | Kinnunen | ............ | B62B 5/0086 |
| 11,577,772 B2* | 2/2023 | DeLanghe | ............... | B62M 27/02 |
| 11,873,019 B1* | 1/2024 | DeLanghe | ............ | B62B 5/0089 |
| 2003/0173752 A1 | 9/2003 | Veeser | | |
| 2004/0032104 A1 | 2/2004 | Savage | | |
| 2006/0090939 A1* | 5/2006 | White | ............... | B62D 55/04 |
| | | | | 180/9.26 |

\* cited by examiner

SNOWMOBILE ASSISTANT DEVICE

FIELD

This application claims the benefit of U.S. Provisional Application 63/190,334, filed May 19, 2021.

FIELD

The present invention is directed to the field of snowmobiles and ski-tracked sleds, and more particularly to the field of devices utilized to raise snowmobiles onto wheels, so as to be moved conveniently across all types of surfaces.

INTRODUCTION

Snowmobiles are popular modes of transportation. Many people use them for recreational purposes, but snowmobiles also are used for commercial and various utilitarian purposes. Generally, snowmobiles are operated on snow or ice, with most having a front-mounted engine and a rear track system.

The snowmobile vehicle, or sled, is typically two skis both located on the front end with a tracked system on the rear. Due to the construction, most sleds struggle with transportation on terrain that is not covered by snow or ice. Many skis have cleats or runners, which can be damaged by gravel or loose rocks, or alternatively may get stuck while operating in muddy surfaces. Thus, many persons choose to transport their sled to a more ideal location as opposed to driving it directly from a storage location to the desired operational area.

If a human user on a sled gets to a location that is not ideal for a snowmobile for any reason, said user may spend time looking for another location so as to cross over the surface, or else the user will have to accept the risk of potential damage to the sled skis in so traveling across the not ideal location to a snowier, and thus more desirable, surface.

To move a snowmobile from a position on a surface, such as the ground, a garage, or a shed floor to that of the surface of a trailer, a ramp is typically employed. A human user of the sled will actuate the sled engine and drive said sled onto the trailer. As previously discussed, this process is friction intense and may result in damage to the skis, damage to concrete or blacktop, chipping of paint, or even damage to the trailer or trailer ramp itself.

When a trailer is utilized, the width of the trailer is generally encompassed almost entirely by the snowmobile, or two snowmobiles side-by-side, should a wider trailer be used. Thus, any device which would extend the width of the snowmobile would render a smaller trailer inoperable.

What is needed, therefore, is a device which can properly stabilize the sled so as to allow for the maneuverability across surfaces with snow, barren surfaces, and across ice-covered terrain. Additionally, there is a need for a device that allows for the ease of loading said vehicle onto a trailer for transportation.

BRIEF SUMMARY OF THE INVENTION

The present invention is directed to a snowmobile assistant device that allows for a snowmobile to be raised above its front ski level, such that mobility is performed by the snowmobile assistant device or devices, to prevent damage to the skis of the snowmobile or any other ski-bound vehicle.

The snowmobile assistant device has a wheel, such as a rubber wheel or a plastic wheel, or the like, wherein said wheel is preferably a flat-free wheel. Whether the wheel is plastic, made entirely of rubber, or a rubber wheel filled with foam, the wheel will not lose PSI in colder climates, and can be operated over sharp rocks and uneven terrain without worrying about a flat tire or the deflating of a pneumatic tire. The wheel measurement will be dependent in some regard to the clearance of the sled as will be defined later. The snowmobile assistant device is attachable and may be retroactively fitted upon current snowmobiles by way of an extra thread upon a hex screw or bolt of the snowmobile. Should there not be enough extra thread, a replacement longer, or lengthier, bolt or hex screw may be replaced on the sled by replacing a current bolt.

So as to not increase the width of the snowmobile, otherwise known as sled, itself the wheels are deployed on the interior portion of the sled, being defined as that space between the two skis of the snowmobile. It can also be used on the otter of ski if clearance is an issue on the snowmobile.

Removably attaching to the extra thread as discussed before, is an axle. The axle should be made of non-malleable material such as a metal; for example: iron, aluminum, or steel. In one embodiment, the axle is made of stainless steel, so as to prevent rusting or burring. Alternatively, the axle can be constructed of carbon steel and achieve substantially the same effect.

Within the surface of the wheel is an opening which the axle extends to, through, and out therefrom. The wheel unit additionally comprises at least one ball bearing, which is near the surface of the wheel opening and the ball bearing may be configured, attached, or otherwise connected to the center of the wheel unit itself. Thus, the axle is positioned outside the interior of the wheel on both faces of the wheel, which is known as a planar position of both a front and a rear. This will be appreciated upon review of the attached figures.

The axle is generally cylindrical and has a first distal end and a second distal end. On a first distal end of the axle extended through the wheel and towards the interior portion of the sled is a tightening wheel which is attached, configured, or otherwise connected to said first distal end of the axle. This tightening wheel is made of a non-malleable material such as steel, iron, or aluminum so as to prevent damage thereto. The tightening wheel surrounds the first distal end of the axle. The axle first distal end may have an opening located thereon, wherein an attachment piece, such as a bolt or a screw can enter, or be received, and thus secure the fit of the tightening wheel to the first distal end of the axle. Additionally, it is presently thought that the first distal end may have a square, or a cube, shape thereon. The square shape will allow fitting and pressure on multiple sides, which allows for a rigid tight fit thereon.

The second distal end of the axle couples with an extended portion of extra thread on the bolt and on the bolt nut. Located at the second distal end is an interior recess portion. The interior recess portion extends partially the length of the cylindrical axle, wherein it is enclosed by an interior recess portion wall. This recessed portion, or cavity, surrounds the bolt and nut thereon and secures a tight fit. Surrounding the opening of the interior recess portion may additionally be an interior recess axle lip. The axle lip is a slightly larger diameter portion than that of the interior recess portion of the axle. The lip allows for greater contact around the bolt nut and securing a tighter fit.

A human user is able to tighten the fit of the axle on said extra thread of the hex screw or bolt by turning the tightening wheel. Within the wheel unit, towards the face is a ball bearing. The ball bearing may be a dual ball bearing, to allow for ease of movement, such as the tightening of the device around the ski bolt extra threading.

In order to reach the extra thread, a human user will grasp the snowmobile ski and lift it generally vertically upwards, being defined as moving the ski to a position located away from the resting surface of the ski. The amount of lift required is minimal, and thus movement will allow access and mating of the second distal end to the extra thread. Once the coupling has occurred, the user may release the lift and set the ski down, wherein the weight of the ski should rest on a surface of the snowmobile assistant device wheel.

To encourage a secure fit, a washer may also be utilized, to prevent accidental loosening of the second distal end of the bolt or hex screw to the axle while operating the sled.

As briefly mentioned, but not described in detail prior, there are measurements which must be taken into account when utilizing the snowmobile assistant device of the present disclosure. For one, a distance known as the offset, is defined herein as the measurement between the edge of a snowmobile ski side wall and the rear face of the wheel, being known herein as the face of the wheel closest to the ski side wall. This offset is correlated to the amount of extra thread on the hex screw or the bolt. If this is not a sufficient length, then the snowmobile assistant device will contact the snowmobile ski side wall and rub, causing unintended friction.

A second measurement is what is known as the upper clearance. The upper clearance is the distance of the uppermost portion of the wheel, or perimeter or circumference of the wheel, to the center point of the wheel opening. This distance is used to ensure that the uppermost portion of the wheel does not contact with a front suspension bar, as shown below in the figures.

The third measurement is the lower clearance. This is the name for the distance of the lowermost portion of the wheel, or the perimeter or circumference of the wheel, to the center point of the wheel opening. This is used to calculate and ensure that the lower portion of the ski will be lifted from the surface of the ground or floor, such that the lowermost portion of the wheel is what contacts said ground or floor surface.

As is obvious to one with skill in the art, if the first measurement is not sufficient in length, an extended hex screw or bolt should be used to retrofit the snowmobile. Continuing on, if these final two measurements are not sufficient, a larger or smaller wheel should be employed depending on the circumstances. Replacing the size of the wheel does not depart from the spirit of the present disclosure.

Additionally, an aluminum storage bracket is provided. The aluminum storage bracket includes a plurality of self-tapping screws, which allows for securing and storage of the snowmobile assistant device when not in use. It also provides a condensed package, such that it is easily able to be stored within a snowmobile compartment.

These and various other features, advantages, modes, and objects of the present invention will be made apparent from the following detailed description and any appended drawings.

DRAWINGS DESCRIPTION

One or more preferred exemplary embodiments of the disclosed invention are illustrated in the accompanying drawings in which like reference numerals represent like parts throughout and in which.

Before explaining one or more embodiments of the disclosed invention in detail, it is to be understood that this invention is not limited in its application to the details or modes of construction and the arrangement of the components set forth in the following description or previously disclosed illustrations. This invention is capable of multiple embodiments and modes, which can be practiced or carried out in many various ways. Also, it is to be understood that the phraseology and terminology employed herein is for the purpose of description, and should not be regarded as limiting, or used as an absolute.

DETAILED DESCRIPTION OF THE PREFERRED EMBODIMENT

Figure 1:
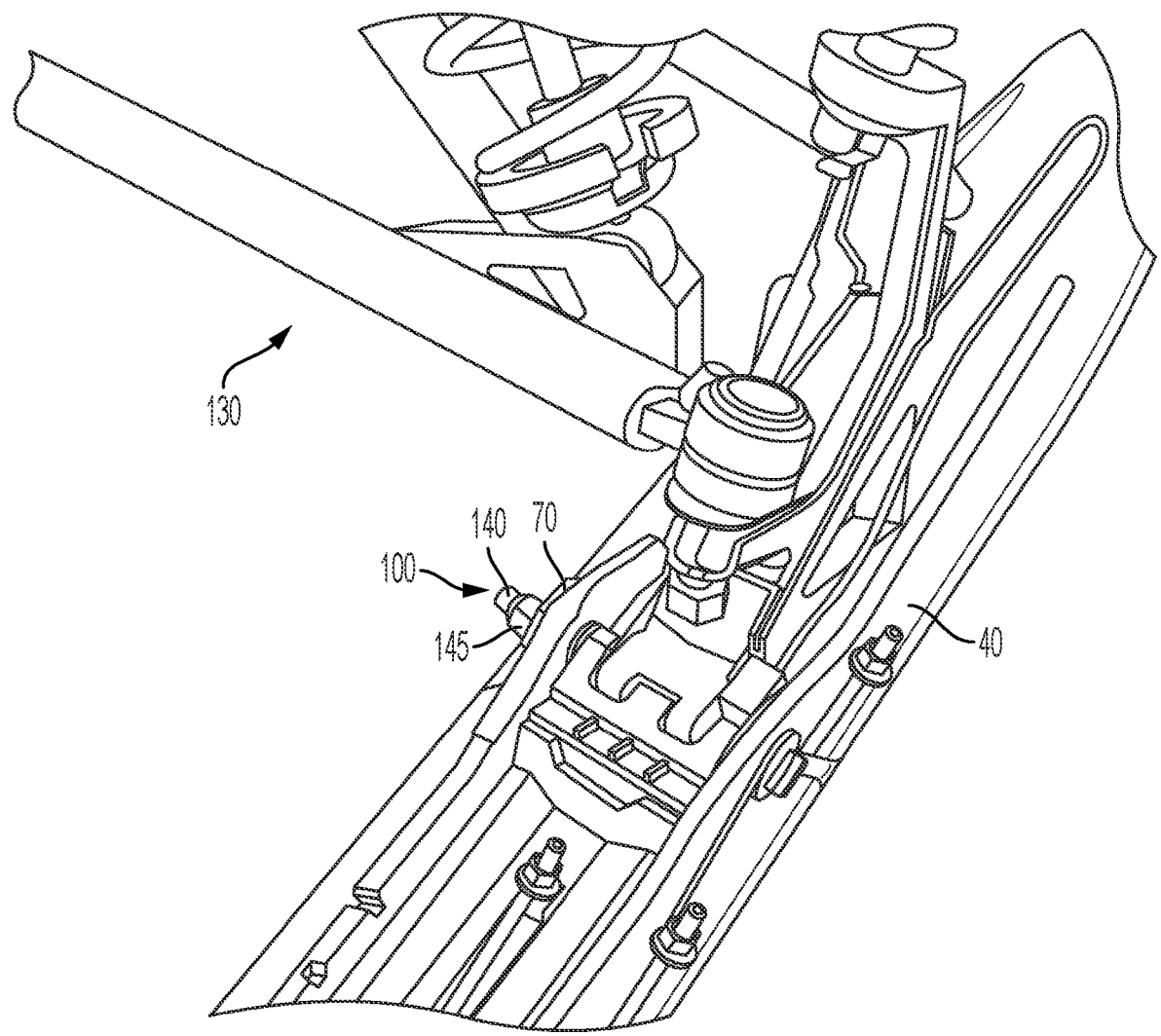
FIG. 1 is a perspective view of a snowmobile ski, showing the extra thread of the hex screw or bolt.

Referring now to the drawings in detail, FIG. 1 illustrates a closeup view of a snowmobile ski 40, in which a ski hex screw or bolt 100 is shown, wherein an extended portion of said bolt 100 extends outwardly away from the snowmobile ski 40. A washer 70 is employed, which evenly distributes the load applied on the threaded bolt 100 by a supplied bolt nut 145. The bolt 100 has an extra portion of threading 140, which is defined herein as the amount of threading disposed away from the bolt nut 145 and extending generally towards the interior portion of the sled 130. As previously described, the interior portion of the sled 130 is the space located between the two skis 40 of a snowmobile.

Figure 2:
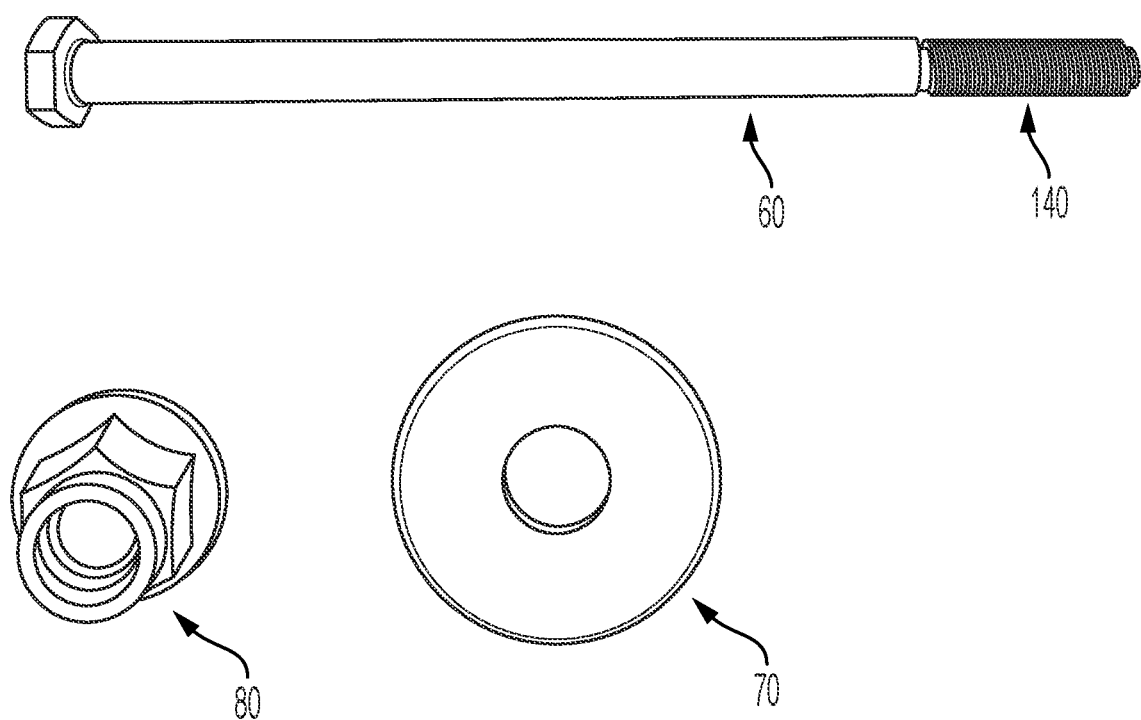
FIG. 2 is a view of components used to attach an extended bolt.

Turning to FIG. 2, a series of components are shown. An extended bolt 60 is shown in this image, which can be used to replace the current ski bolt 100, if it is too short in length such that there is not sufficient extra thread 140. The extended bolt 60 will provide this additional extra thread of the bolt 140, which is essential to the mounting of the device as is shown later. Additionally, a washer 70 is depicted, and as earlier mentioned, will prevent excess surface pressure on the mounting surface, and to increase the stiffness, or rigidity, of the clamping surface, while located on the extra thread of the bolt 140. Further, a lock nut 80 is provided, so as to resist loosening while operating.

Figure 3:
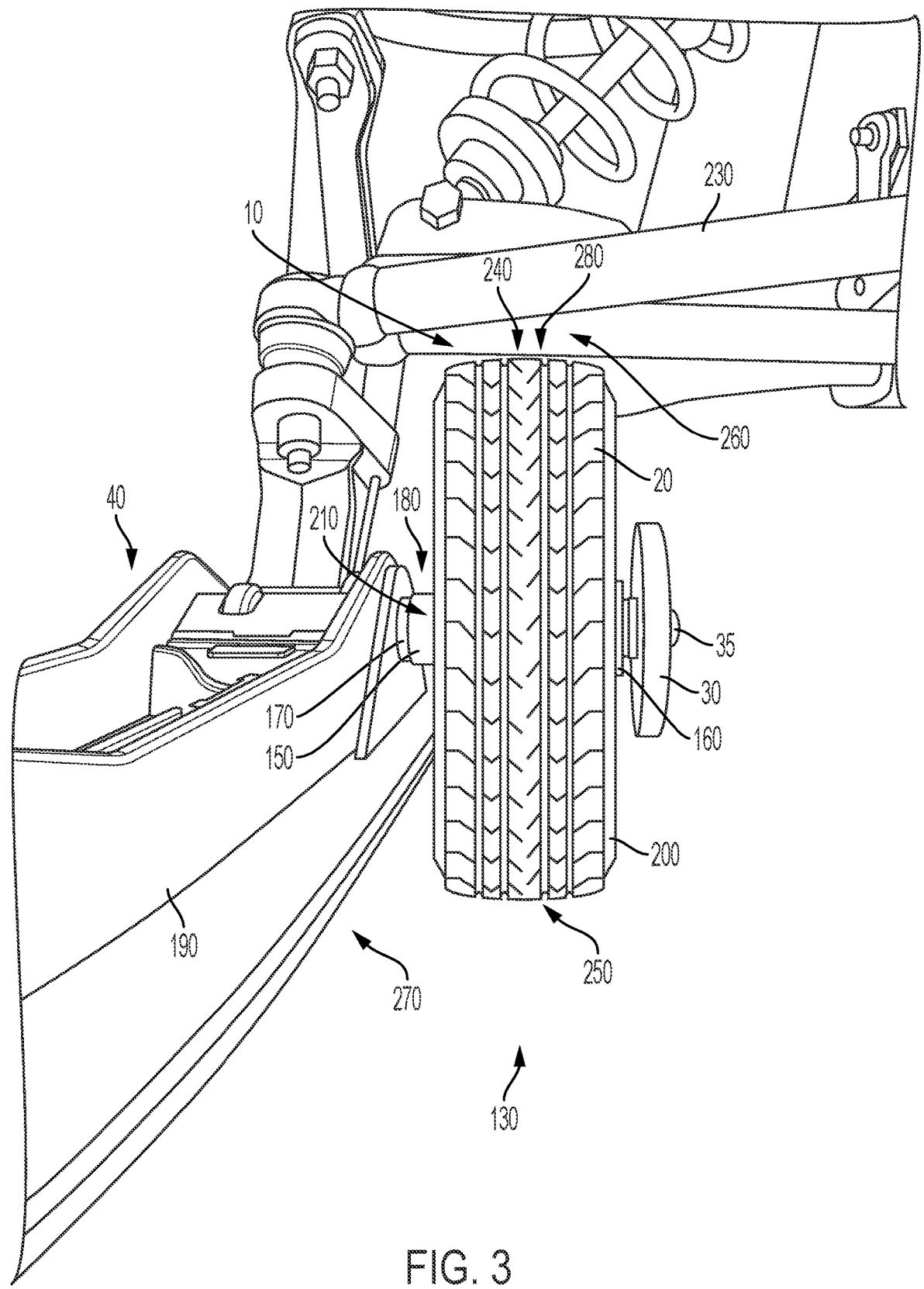
FIG. 3 is a perspective view of an embodiment of the snowmobile assistant device shown attached or coupled to a ski extra threading on the hex screw or bolt.

Now looking at FIG. 3 a preferred embodiment of a snowmobile assistant device 10 constructed in accordance with the present invention is shown while in mounted position. This particular embodiment is shown installed upon a generic snowmobile ski 40, and more particularly mounted such that it makes contact on a snowmobile ski side wall 190. As generally referred to above, an axle 150 is provided with a first distal end 160 and a second distal end 170. The axle 150 is positioned through a wheel unit 20 and deployed at a position wherein the first distal end 160 extends from a front face of the wheel 200, and a tightening wheel 30 is deployed on said first distal end 160. The second distal end 170, is the portion extending through the wheel unit 20 at a position therefrom nearest the rear face of the wheel 210, and nearest the snowmobile ski side wall 190. The area between the snowmobile ski side wall 190 and the rear face of the wheel 210 is known as the offset 180. Should the offset 180 not be sufficient, the rear face of the wheel 210 will contact the snowmobile ski side wall 190, creating unintended friction and could prevent the wheel unit 20 from being able to rotate properly. The correction for this is to increase the length of the ski bolt 100 by way of an extended length extra thread bolt 140, as shown in FIG. 2, or by increasing the length of the axle 150 itself, so as to increase the distance between the snowmobile ski side wall 190 and the face of the wheel 210.

Turning back to FIG. 3, around the circumference, or the perimeter 280, of the wheel unit 20, are positions generally known as the uppermost portion of the wheel 240 and the lowermost portion of the wheel 250. As the wheel unit 20 rotates around an axis, wherein the axle 150 is positioned, the just referred to parts will not correlate to an exact portion of the wheel unit 20 itself, but rather be a generic position as depicted here.

On this generic snowmobile, a front suspension bar 230 is shown which is generally the lowermost point of the snowmobile frame. However, snowmobiles could have a different frame piece as the lowermost portion as to a surface area such as the ground. In such a circumstance, the front suspension bar 230 may be a different component while serving the same function as to the definition of the upper clearance 260.

The upper clearance 260 is defined herein as the area of space between that of the center of the wheel unit, which is the center of the attachment piece of the tightening wheel 35, and the front suspension bar 230. Should the space created be too short in length, the uppermost part of the wheel unit 240 will unintendedly contact with the front suspension bar 230, preventing full rotation, or creating excess friction. The correction for this would be to use a wheel unit 20 with a smaller diameter, thus creating more clearance.

As defined herein, the lower clearance 270 is the area between a contact surface, such as the ground or a floor, and the center of the wheel unit, which is the center of the attachment piece of the tightening wheel 35. If the lower clearance 270 is not sufficient, the contact point for the generic snowmobile will be the bottom of the snowmobile ski 40, instead of the lowermost portion of the wheel 250. In such a circumstance, the snowmobile assistant device 10 will not be sufficient to lift and maneuver the snowmobile itself.

Figure 4:
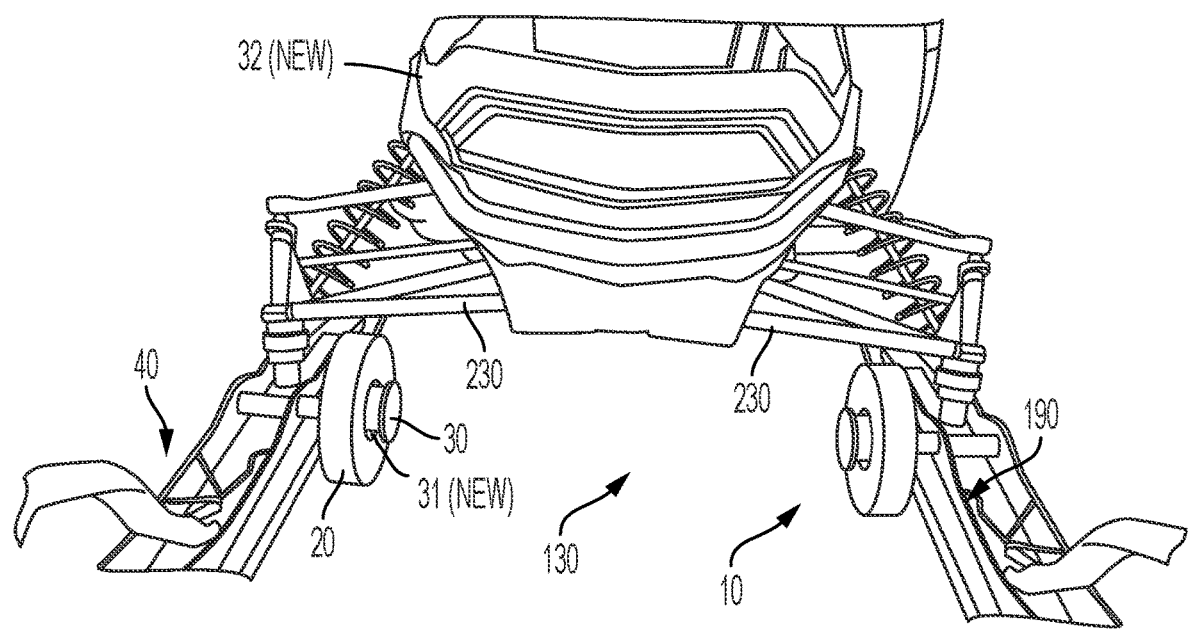
FIG. 4 is a perspective view of a snowmobile assistant device attached or coupled to a snowmobile in the interior portion of the sled.

FIG. 4 is a depiction of the front view of a generic snowmobile. In said view, the snowmobile assistant device 10 is present, wherein there are two devices 10. As described above, these devices are positioned generally near the snowmobile ski side wall 190, at a position within two snowmobile skis 40, known as the interior portion of the sled 130. As can be appreciated here, the lower clearance 270 should be sufficient enough such that the snowmobile skis 40 are raised in the air, defined as positioned above the contact surface of the floor or ground.

Figure 5:
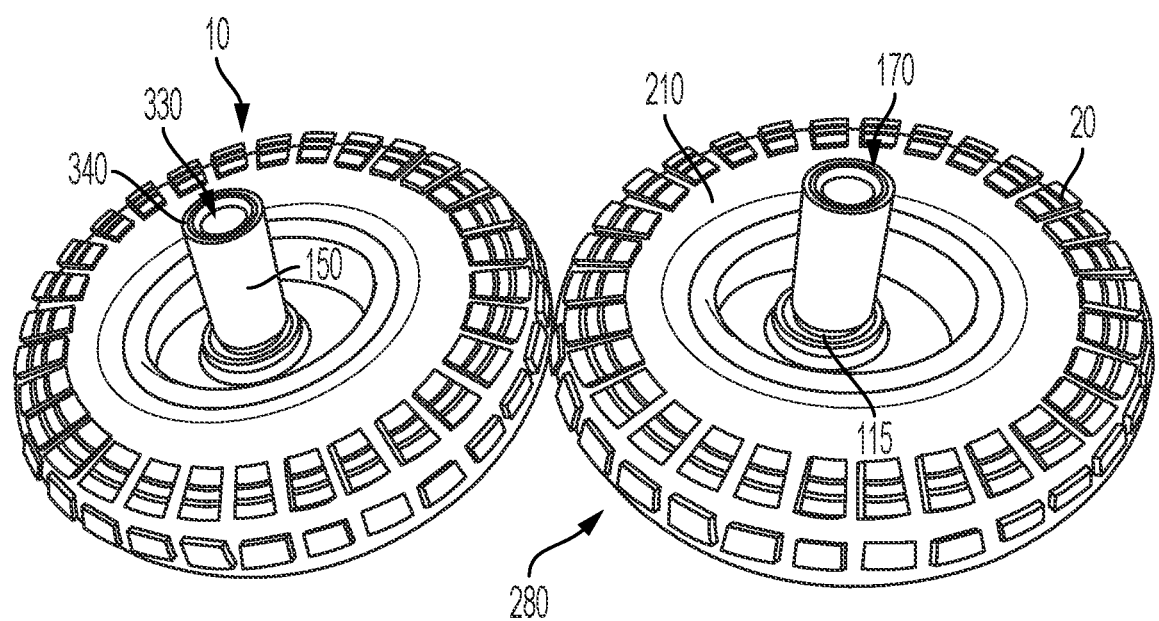
FIG. 5 is a perspective view of an embodiment of the snowmobile assistant device highlighting the second distal end of the axle.

Looking now at FIG. 5 is a view of the snowmobile assistant device 10, highlighting the second distal end of the axle 170. As is shown, there is a contact point on the second distal end 170, such that the axle 150 is able to mate or connect with the extra thread on the bolt 140, shown in FIG. 1. Turning back to FIG. 5, the wheel unit 20 is shown, highlighting the rear face of the wheel 210. The wheel 20 is shown here as a flat free tire, which is known to be advantageous as it will not lose PSI, as pneumatically filled tires are known to do, particularly in colder climates and snowmobiles operate almost exclusively in colder climates. The axle 150 as extended upwards highlights the interior recess portion of the axle 330, which envelops the bolt 100. The interior recess portion of the axle 330 can also surround and tighten around the bolt nut 145 by way of an interior recess axle lip 340, which is known as a lowered portion, creating a slightly larger diameter within the inner diameter by way of reduced material thickness. The recessed portion is contained by an interior recess portion wall 335, which is the base wall of the recessed area.

Figure 6:
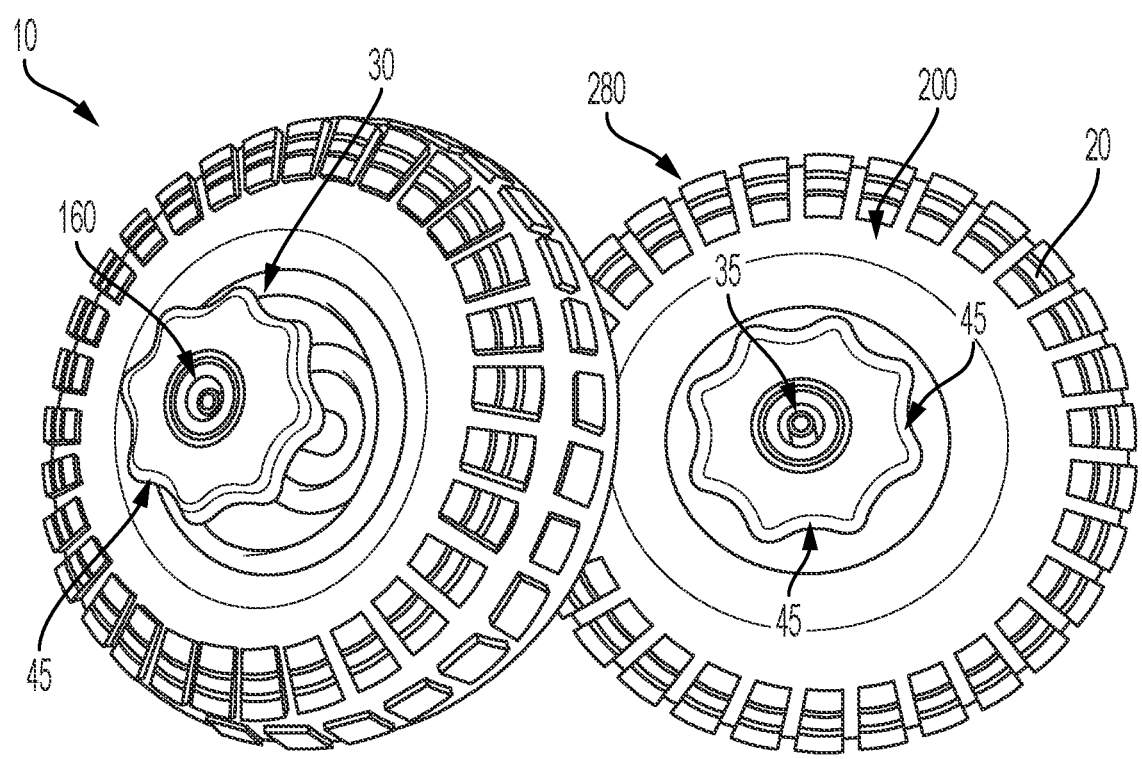
FIG. 6 is a perspective view of an embodiment of the snowmobile assistant device highlighting the first distal end of the axle, wherein a tightening wheel is attached, formed, configured, or affixed thereto.

FIG. 6 is the inverse view of FIG. 5, wherein FIG. 6 shows a flat free tire wheel 20 wherein the focus is on the front face of the wheel 200. A tightening wheel 30 is provided which is attached to the first distal end of the axle 160. The tightening wheel 30 surrounds the first distal end of the axle 160 and is attached thereon by an attachment piece 35. The attachment at present is thought to be any attachment device for securing, such as a bolt or a screw, such as a socket cap screw; the socket cap screw allows for mechanical machining resulting in precise dimensioning with a flush screw head and provides greater torque and resistance to accidental loosening.

The tightening wheel 30 here is a wide grip having numerous finger indents 45 for ease of grip. Thus the human user will put their hand on the center of the wheel unit, which is the center of the attachment piece of the tightening wheel 35, fingers within the finger indents 45, and actuate the tightening wheel 30 clockwise or counterclockwise to tighten or loosen said tightening wheel 30. The presence of finger indents 45 allows for greater torque by a human user, without the necessity of tools. Thus, a human user can engage and subsequently disengage the snowmobile assistant device 10 without tools, in any environment, in a precise and quick manner.

Figure 7:
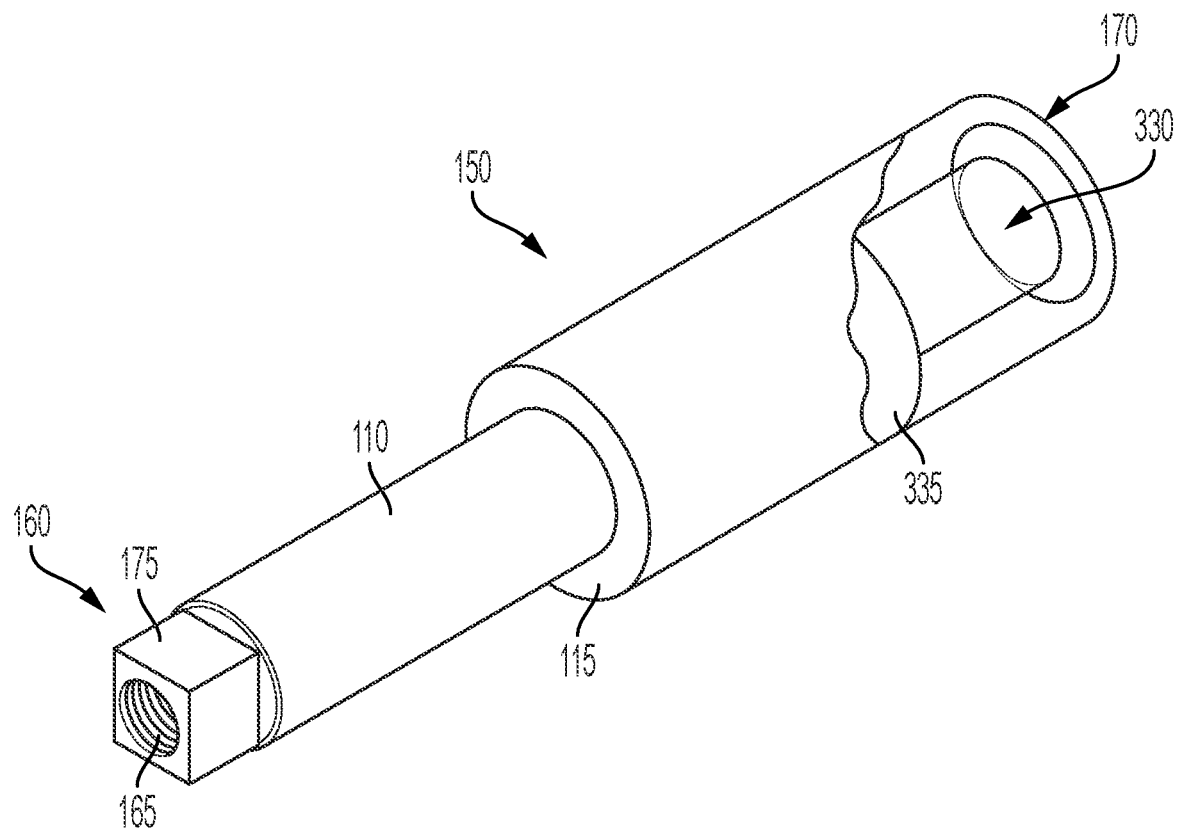
FIG. 7 is a view of the axle, further highlighting the slimmed cylindrical component of said axle on a first distal end.

The axle 150 of the present disclosure is shown in FIG. 7. This embodiment has a slimmed cylindrical component of the axle 110 near the first distal end of the axle 160. An axle contact face 115 is provided to contact with the exterior edge of the rear face of the wheel 210, such that the entire axle 150 will not pass therethrough. With the axle contact face 115, only the slimmed cylindrical component of the axle 110 extends beyond the wheel unit 20 and the front face of the wheel 200.

The interior recess portion of the axle 330 is shown in this partially cutaway view. As described herein, the interior recess portion 330 is located at the second distal end of the axle 170, and additionally contains a ball bearing 120 therein. The interior recess portion 330 extends a partial length of the axle 150 itself, such that only a portion of the axle 150 has the interior recess portion 330, which is closed and defined by the presence of a recess portion wall 335.

The first distal end of the axle 160 receives the tightening wheel 30 and allows for the tightening and loosening therefrom. The end of the first distal end of the axle 160 is shown to be a squared end 175, such that the edges of the square provide extra grip for the mating with the tightening wheel 30, as described earlier. Further, an opening of the first distal end 165 is shown, which may additionally be threaded, to allow for mating with an attachment piece of the wheel unit 35 as in a bolt or a screw such as a socket cap screw, such that the secure mating with a tightening wheel 30 is achieved.

Figure 8:
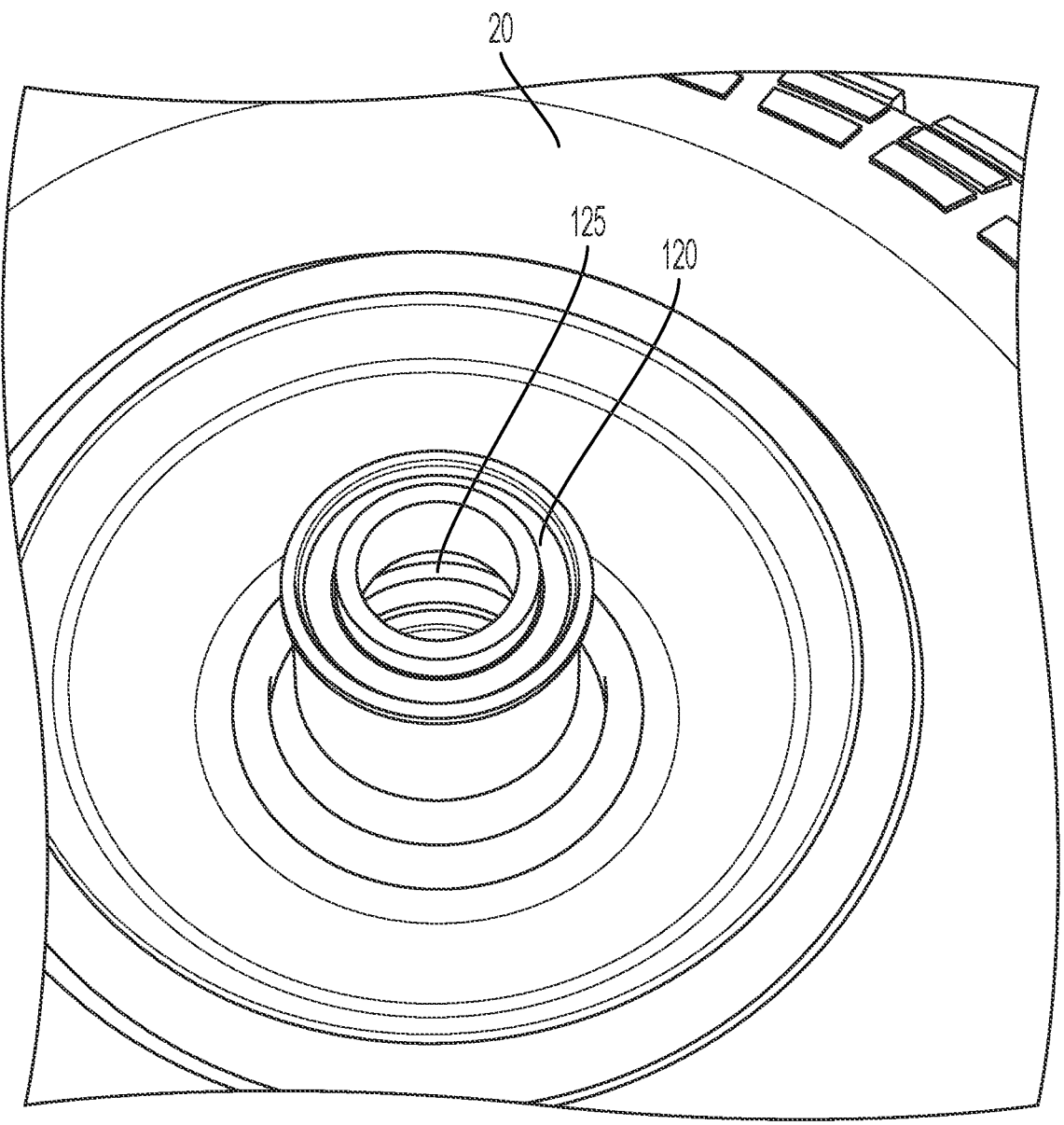
FIG. 8 is a closeup view of the ball bearing of the snowmobile assistant device located near the center of the wheel unit.

Looking now to FIG. 8, as shown here, a ball bearing 120 is positioned within the wheel unit 20. This ball bearing 120 is also contemplated to be a dual ball bearing to provide for extra rotational ability. The presence of the ball bearing 120 allows for smooth, reduced friction rotation of the axle 150, which is positioned within a ball bearing opening 125, and said rotation thus creates great rotation of the wheel 20 and the axle 150 itself, such that the snowmobile assistant device 10 can be affixed to the snowmobile ski 40 at a position within the interior portion of the sled 130, which will prevent the snowmobile from becoming a wider device. As can be appreciated, the interior portion sled installation allows the snowmobile to maintain the same width, which allows snowmobiles to stay within trailers and other locations where the width of the sled is important.

Figure 9:
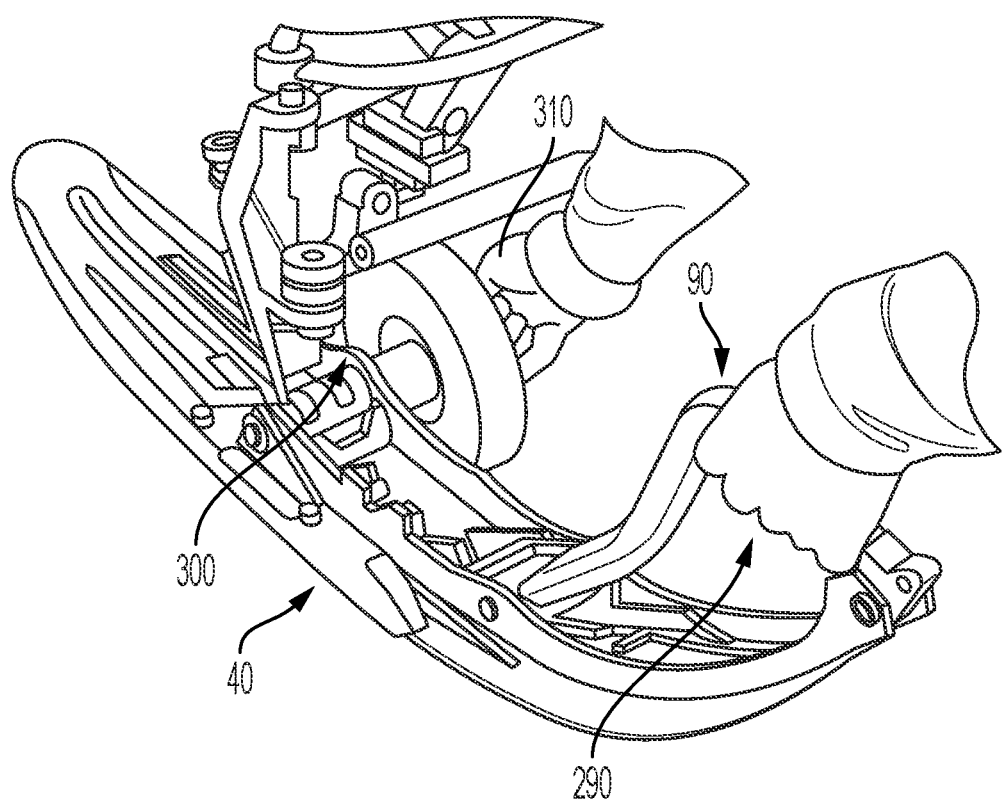
FIG. 9 is a view of a method of deployment of the snowmobile assistant device, wherein a human user is providing upward force on the ski to create clearance for attachment.
Figure 10:
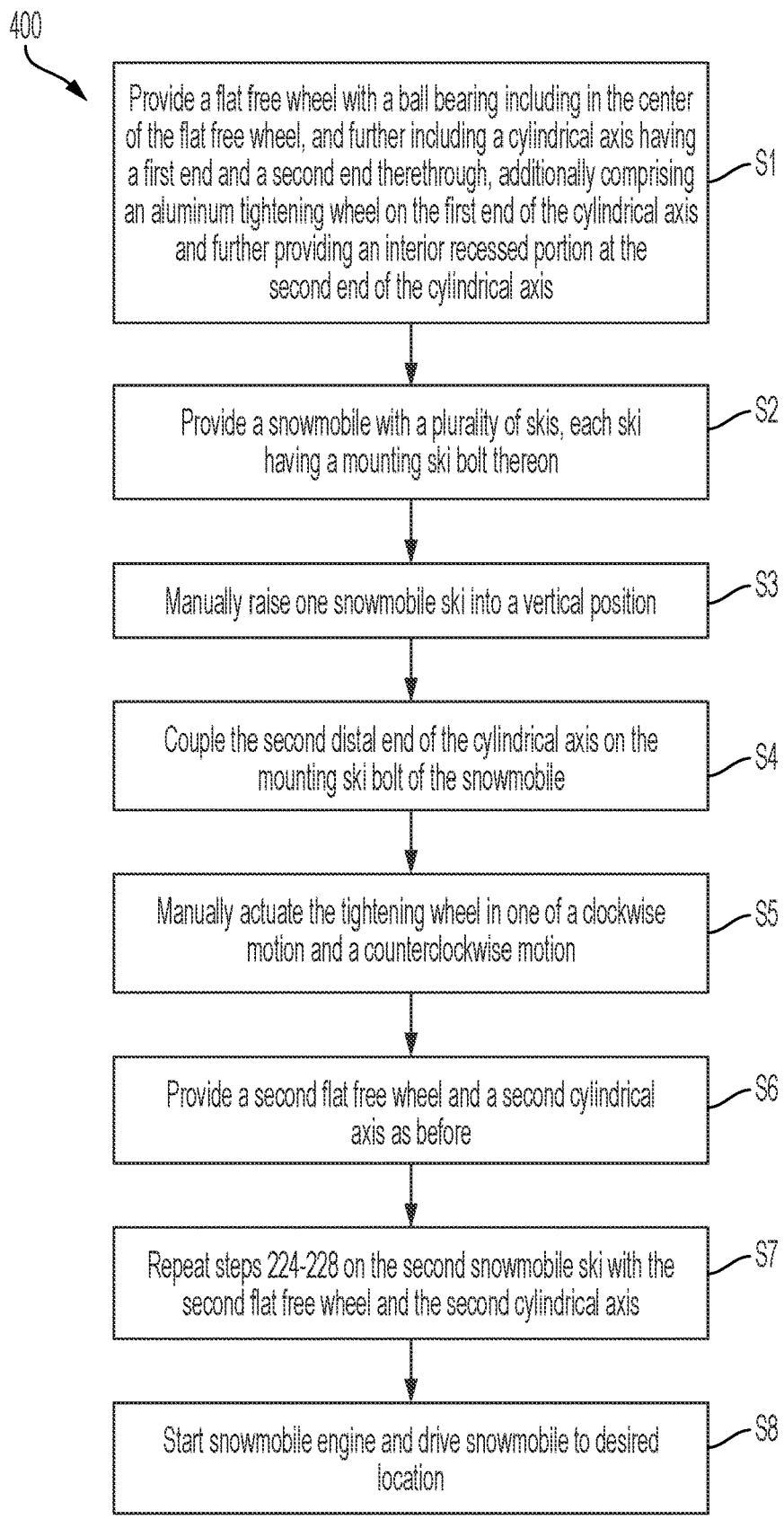
FIG. 10 highlights the steps of installing the snowmobile assistant device to a snowmobile and moving said snowmobile to a desired location.

FIGS. 9-10 depict some steps to install and use the snowmobile assistant devices 10 of the present disclosure. The first step as shown is to apply upward pressure on the snowmobile ski 40, known as the step of: lifting the ski of the snowmobile 290. Next, a human user will mate or couple the axle second distal end to the extra thread 300, as described in detail above. Once in position, a human user will hand tighten the tightening wheel 310. After these steps are completed, the human user will release their grip of the ski 40, such that the ski 40 is lowered to the ground. Provided the lower clearance 270 is sufficient, the ski 40 will not contact the ground at the frontmost point of said ski 40, but rather will rest upon the lowermost portion of the wheel 250.

A human user will then drive the snowmobile into desired position. After the snowmobile has come to a complete stop, the user will then turn off the snowmobile. Climbing off the snowmobile, the human user will go the front of the snowmobile, and once again apply upward pressure on the snowmobile ski, lifting the ski 40 in the air. The user will then hand loosen the tightening wheel, such that the snowmobile assistant device 10 is released from its mating or mounting position. The human user can then release the ski 40, lowering it down such that the snowmobile rests upon the skis 40 again. If desired, the user may then mate, attach, or couple the snowmobile assistant devices 10 to a storage bracket 50, and place them away for storage.

Understandably, the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood and appreciated that, although the foregoing description and drawings describe and illustrate in detail one or more preferred embodiments of the present invention, to those with skill in the art to which the present invention relates, the present disclosure will suggest many modifications and constructions, as well as widely differing embodiments and applications without thereby departing from the spirit and scope of the invention and method disclosed thereof.

What is claimed is:

1. A snowmobile assisting wheeled device adapted to attach to and move a snowmobile having at least one ski and a bolt with threading therethrough, said wheeled device comprising:
    a flat free wheel having a front face and a rear face, wherein a flat free wheel opening is formed through the front face and the rear face;
    a cylindrical axle having a first distal end and a second distal end, wherein said cylindrical axle is inserted through the flat free wheel opening, such that the first distal end extends beyond the front face of the flat free wheel, and wherein the second distal end extends beyond the rear face of the flat free wheel;
    an interior recess portion contained within said axle at the second distal end and extending partially across the length of the axle;
    a tightening wheel surrounding the first distal end of the cylindrical axle;
    an attachment piece mechanically securing the tightening wheel to the first distal end of the cylindrical axle; and
    wherein the second distal end of the cylindrical axle is removably mechanically connected to the snowmobile bolt threading.

2. The snowmobile assisting wheeled device of claim 1, wherein the axle is constructed from stainless steel.

3. The snowmobile assisting wheeled device of claim 1, wherein the axle is constructed from carbon steel.

4. The snowmobile assisting wheeled device of claim 2, wherein the tightening wheel is constructed of aluminum.

5. The snowmobile assisting wheeled device of claim 4, wherein the wheel is a flat free wheel constructed of plastic.

6. The snowmobile assisting wheeled device of claim 4, wherein the wheel is a flat free wheel constructed of rubber.

7. The snowmobile assisting wheeled device of claim 1, further comprising a washer located between the snowmobile bolt threading and the second distal end of the cylindrical axle of the snowmobile assisting wheeled device.

8. The snowmobile assisting wheel device of claim 7, further comprising a lock nut mechanically connected on the snowmobile bolt threading.

\* \* \* \* \*